Sept. 4, 1934.  A. M. TROGNER  1,972,501
REMOTE SWITCHING CONTROL SYSTEM
Filed Dec. 14, 1932   2 Sheets-Sheet 1
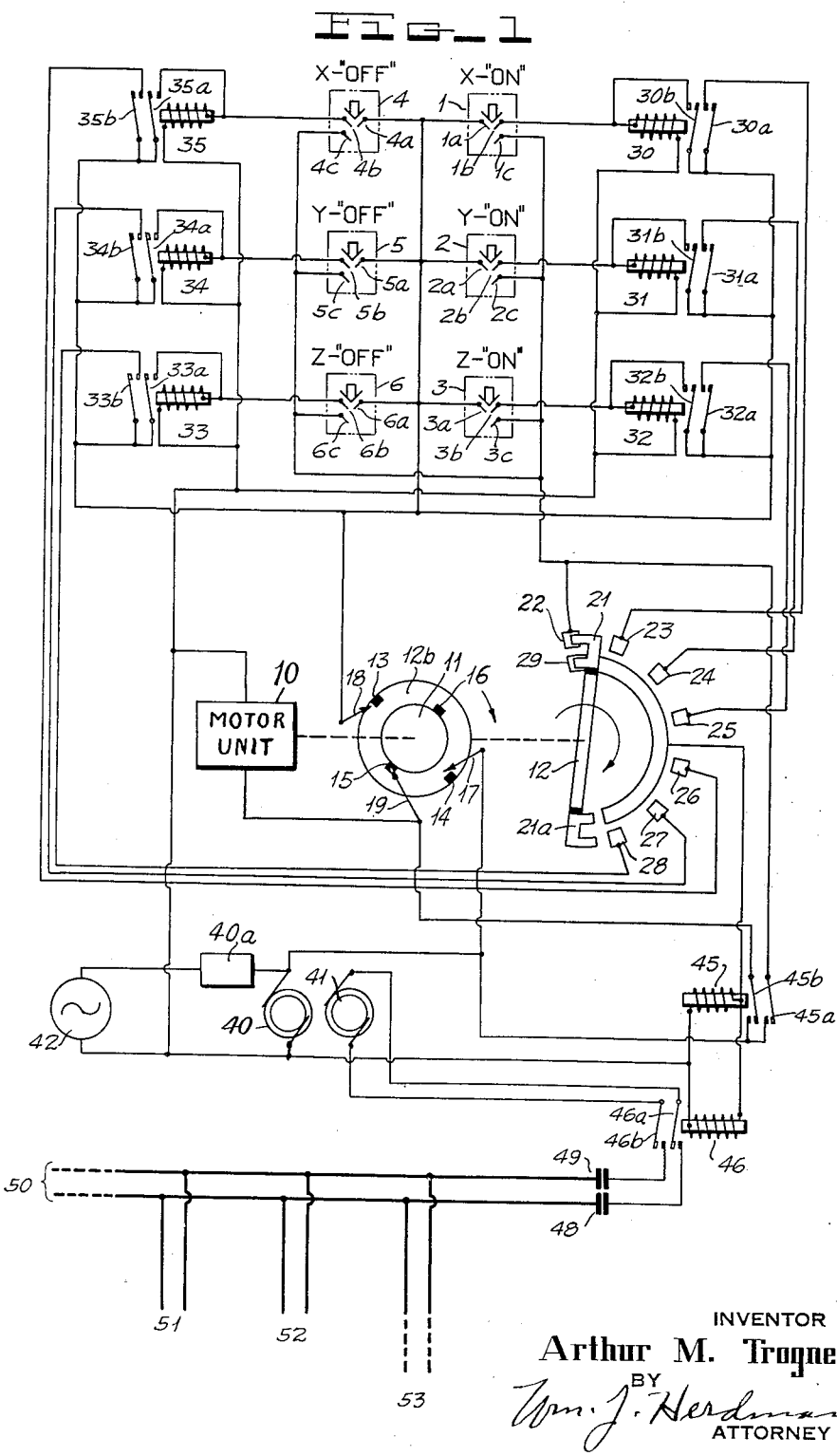
INVENTOR
Arthur M. Trogner
BY
Wm. J. Herdman
ATTORNEY

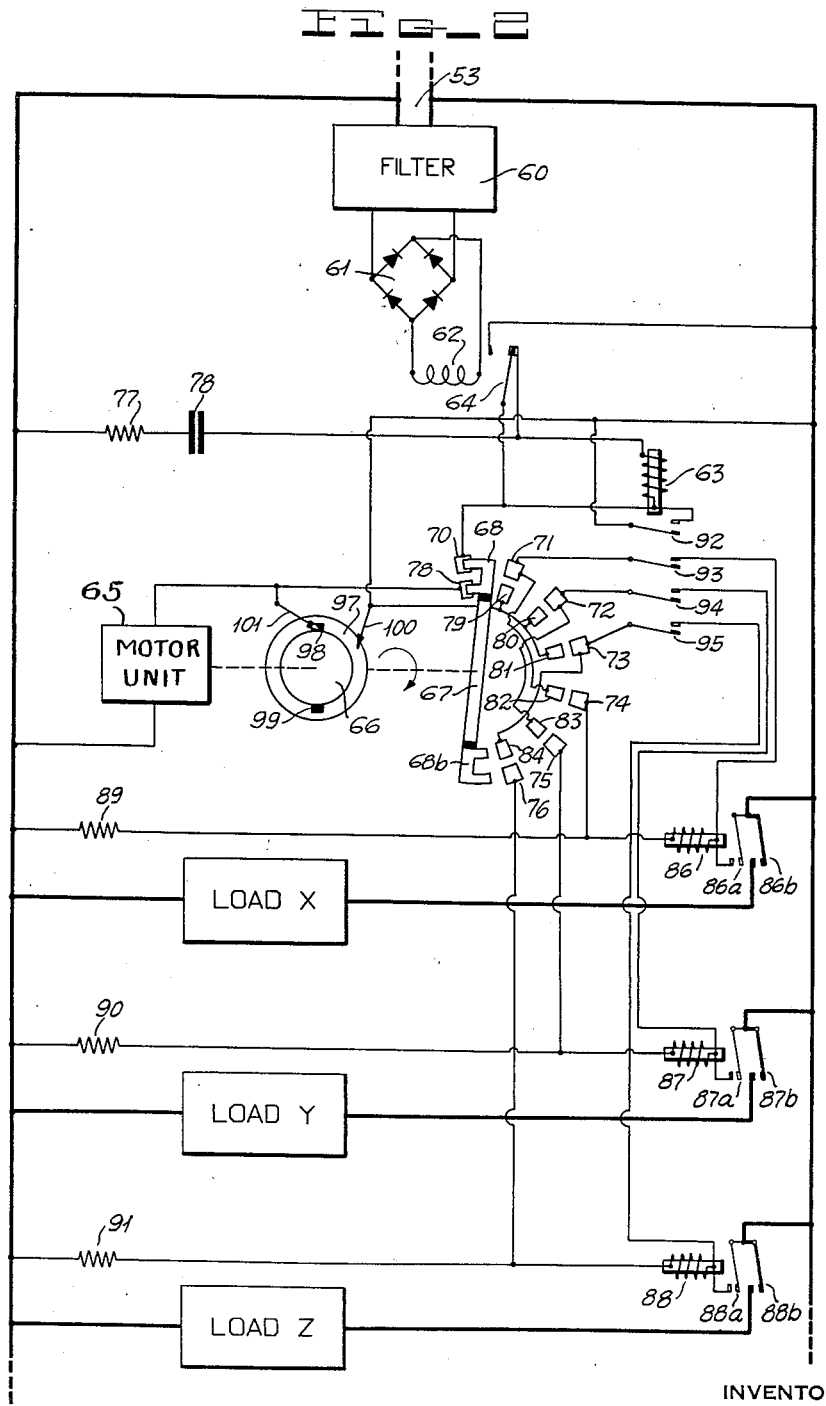

Patented Sept. 4, 1934

1,972,501

UNITED STATES PATENT OFFICE 1,972,501

REMOTE SWITCHING CONTROL SYSTEM

Arthur M. Trogner, Maplewood, N. J., assignor to Wired Radio, Inc., New York, N. Y., a corporation of Delaware Application December 14, 1932, Serial No. 647,120

6 Claims. (Cl. 171—97)

My invention pertains in general to control systems and specifically relates to means for remotely controlling selective switching operations.

One of the objects of my invention consists in providing a control system having a plurality of manually operated controlling switches for effecting the selective connection and disconnection of remotely situated power loads.

Another object comprises providing a control system particularly adapted for use in connection with power distribution networks for remotely controlling various power loads through the agency of carrier current impulses impressed on the power distribution network.

A further object consists in providing a remote control system employing a plurality of selectively operable keys for predetermining the effective operation of an impulse sending device for selecting a desired control circuit.

A further object comprises providing a control system having controlling apparatus and controlled apparatus utilizing synchronous devices for cooperation with selection circuits for effecting the operation of desired power loads.

These and other objects will be apparent from the following, reference being had to the accompanying drawings illustrating one embodiment of my invention in which;

Fig. 1 is a diagrammatic representation of the controlling apparatus employed in my system; and Fig. 2 is a diagrammatic representation of the controlled apparatus of my invention.

The apparatus depicted in Fig. 1 is nominally located in a power central station or substation in association with the commercial power generation or transformer equipment. The controlled apparatus, such as shown in Fig. 2, is located in proximity to the loads to be controlled and may be situated at various remote points of the power distribution network.

The controlling apparatus of my invention will be considered first. Referring to the drawings in detail, and particularly to Fig. 1, there are provided six momentary contact keys or switches 1-6. These switches are each provided with three contacts so that connections can be made from one circuit to two others. The contacts of switches 1-6 connect with electromagnets 30-35, respectively. Each of the electromagnets 30-35 controls a pair of armatures. These armatures as well as others hereinafter disclosed are provided with suitable springs so that, when their associated electromagnets are de-energized, the circuits controlled by the armatures will be open.

A motor 10, preferably of the self-starting synchronous type, is provided for driving a disc 11 and arm 12 mounted upon a shaft connected with the armature shaft of the motor 10. The disc 11 includes a contacting ring 12b provided with a pair of diametrically positioned outer insulating notches 13 and 14, and a pair of diametrically positioned inner insulating notches 15 and 16. Brush 17 is positioned for continuous contacting engagement with the ring 12b and the brushes 18 and 19 are provided so that, for one position of the disc 11, the brush 18 will have just passed out of engagement with the notch 13 and the brush 19 will be in engagement with the insulating notch 15 as shown in Fig. 1.

The arm 12 is provided, at either extremity, with two-fingered brushes 21 and 21a. Starting at the position shown in Fig. 1, when the arm 12 is rotated by the motor 10 in the direction indicated by the arrow, the outer finger of brush 21 successively engages with contacts 23—28 and the inner finger of brush 21 continuously engages with a contacting sector 29. When, in rotating in the direction of the arrow, the brush 21 leaves the last contacts in its path of travel, that is, just as soon as the brush 21 has left contact 28 and sector 29, the insulating notch 14 will engage with the brush 18 thereby interrupting any previously established circuits for energizing the magnets 30—35. Any subsequent energization of the magnets 30—35 then requires the depression of an associated one of switches 1—6. As the arm 12 and disc 11 continue to rotate, the insulating notch 14 passes out of engagement with brush 18 and the ring 12b engages therewith thereby preparing an energizing circuit to the magnets 30—35. This energizing circuit may be completed to desired ones of the magnets 30—35 by depression of keys 1—6 as before pointed out. When the brush 18 now comes into engagement with the ring 12b, the brush 21a will come into engagement with the contact 22 and sector 29 for a repeat selection operation with reference to contacts 22—28. At the same time, the insulating notch 16 will engage with brush 19 thereby interrupting the energization of motor 10 whereupon the arm 12 and disc 11 are brought to rest with brush 21a in engagement with contact 22 and sector 29, insulating notch 16 in engagement with brush 19, and ring 12b in engagement with brush 18.

A motor-generator set comprising the motor 40 and generator 41 is provided for supplying alternating currents of frequencies suitable for carrier purposes to effect controlling operations in accordance with the principles of my invention. The motor 40 is excited by current derived from a controlled source of alternating current 42 adapted to maintain a stabilized frequency. Suitable means, such as an auto-starter 40a, are provided to effect the proper energization of motor 40.

Electromagnets 45 and 46 are provided with armatures 45a and 45b and armatures 46a and 46b, respectively, for use in conjunction with certain switching functions and in the control of current from the generator 41 in a manner hereinafter described in more detail. The armatures 46a and 46b complete a circuit through coupling condensers 48 and 49 to power busses 50. The power busses 50 are connected with a suitable source of commercial power similar to the source 42, and are provided with outgoing distribution feeder lines 51, 52, and 53. The power busses 50 and feeder lines 51—53 are indicative, in general, of a commercial power distribution system for serving a plurality of outlying consumers.

The feeder lines 51—53 may be respectively connected to various power loads and switching apparatus controlled in accordance with my invention. In the present description, consideration will be given to a typical arrangement of controlled apparatus connected to one pair of feeder lines such as that designated at 53.

Referring to Fig. 2, which is a diagrammatic representation of the controlled apparatus of my invention, a filter 60 is connected with feeder lines 53 for receiving carrier currents within the range of the frequencies generated by the generator 41. The output circuit of filter 60 connects to a full-wave rectifier 61, the conjugate points of which are in circuit with a galvanometer energizing coil 62. The rectifier 61 may comprise copper-oxide elements or may be of any other suitable type. The coil 62 controls an armature 64. Armature 64 controls a circuit including an electromagnet 63 and completed through a resistance 77 and condenser 78. Electromagnet 63 controls, in unison, armatures 92, 93, 94, and 95.

A synchonous motor 65, similar to the motor 10, is provided for driving a contact disc 66 and contact arm 67 in synchronism with the contact disc 11 and arm 12, respectively. The disc 66 includes a contacting ring 97 having two inner and diametrically opposite insulating notches 98 and 99. Brush 100 is provided for continuous contacting engagement with the ring 97 while a brush 101 is provided for engagement with the ring 97 subject to interruption by the insulating notches 98 and 99. In an initial or starting position, such as shown in Fig. 2, the brush 101 is positioned in the notch 98 and insulated from ring 97. At 180° of revolution, the insulating notch 99 will then come into engagement with the brush 101. As in the construction of arm 12 in Fig. 1, the arm 67 in Fig. 2 includes two-fingered brushes 68 and 68b positioned at the opposite extremities of the arm. In the position shown in Fig. 2, when the arm 67 is rotated in the direction indicated by the arrow, the outer finger of the brush 68 is adapted to engage, in succession, with contacts 70—76. The inner finger of brush 68 will, at the same time, engage, in sequence, contacts 78—84. After 180° of rotation of arm 67, the brush 68 will have passed the contacts 76 and 84, and the brush 68b will then be in position to sequentially engage the same contacts as did brush 68. Contacts 71, 72 and 73 are respectively connected, through armatures 92—95, with electromagnets 86, 87 and 88, respectively. Resistances 89, 90 and 91 are connected respectively in series with the electromagnets 86, 87 and 88. Electromagnet 86 controls armatures 86a and 86b. Electromagnet 87 controls armature 87a and armature 87b, while electromagnet 88 controls armatures 88a and 88b. The armatures 86b, 87b, and 88b control power circuits from the feeder lines 53 to loads "X", "Y" and "Z". The loads "X", "Y", "Z" are indicative of means for the consumption of commercial power, the control of which is to be remotely effected by the system of my invention. It will be understood of course, that the representation in the present description is purely arbitrary, and that a great many such loads of different character can be employed as desired.

The general circuits and their function will be more apparent in the description of the operation of my system, which follows: Before any of the switches 1—6 are depressed, the operation of the motor generator 40—41 is initiated so that carrier energy is available for transmission over the power network. To control one of the loads "X", "Y" or "Z", the operator at the controlling station depresses a suitable one of the keys 1—6. For example, assume that it is desired to connect the load "Y" in circuit with the feeder lines 53 so that power is delivered thereto. The operator will then depress the "Y-on" switch corresponding to the load "Y", which is switch 2. Depression of switch 2 completes an energizing circuit through contacts 2a and 2b to electromagnet 31. The circuit which supplies energy to any of the electromagnets 30—35, as well as to the electromagnets 45, 46, is completed through the contact ring 12b of disc 11. In the operation of the apparatus of Fig. 1 in the present stage of description, the energy through this circuit is supplied from a circuit connecting through brush 18, ring 12b, and brush 17, to the source 42.

Energy supplied from the source 42 causes the energization of electromagnet 31 and the actuation of armature 31b and 31a. Simultaneously, the depression of switch 2 completes a circuit from the source 42 through contact 2c to contact 22 and also to armature 45a. The energizing circuit thus established to contact 22 is completed by brush 21 through contact sector 29 to electromagnets 45 and 46. Energization of electromagnets 45 and 46 respectively causes the actuation of armatures 45b and 45a and armatures 46a and 46b.

When the electromagnet 31 is energized by momentary depression of switch 2, the actuation of armature 31b completes a holding circuit from the source of energy to electromagnet 31 independent of contacts 2a and 2b whereby the energization of electromagnet 31 is maintained independently of the switch 2. The switch 2, or any of the associated group of such switches, may therefore be only momentarily depressed to initiate the proper switching operation. Similarly, upon energization of electromagnets 45 and 46, a holding circuit to these magnets is established by actuation of the armature 45a which is interrupted only by movement of brush 21 out of contacting engagement with contact 22.

Actuation of armature 31a establishes a circuit to contact 24. The electromagnets 45 and 46 have now been energized and an energizing circuit has been established from armature 45b to motor 10. The energization of electromagnet 46 has caused the actuation of armatures 46a and 46b so that, coincident with the establishment of the energizing circuit to motor 10, carrier energy from the generator 41 is impressed on the power network through armatures 46a and 46b and condensers 48 and 49. This carrier energy passes over the power network to the controlled apparatus. Referring to Fig. 2, the carrier energy passes through filter 60 and rectifier 61 to cause the energization of the galvanometer coil 62. Energization of coil 62 effects the actuation of armature 64. When the armature 64 is thus actuated, a short-circuit of electromagnet 63 is removed and an energizing circuit from feeder lines 53 through resistance 77 and condenser 78 is established to electromagnet 63 and contact 70. The brush 68 completes an energizing circuit from contact 70 to contact 78 and thence to motor 65 whereupon the operation of motor 65 is initiated coincident with the initiation of the operation of motor 10 of the controlling apparatus in Fig. 1.

The resistance 77 and condenser 78 are connected in series with the electromagnet 63 whereby actuation of armature 64 applies a voltage to electromagnet 63. When the armature 92 is actuated, a holding circuit to electromagnet 63 in parallel with the circuit through armature 64 is completed whereby operating voltage is applied directly from the lines 53. This holding circuit is interrupted only when coil 62 is de-energized and the release of armature 64 causes the short-circuit of electromagnet 63. Such an arrangement including the circuit through resistance 77 and condenser 78 is provided so that a power circuit from lines 53 is not directly broken by armature 64 when released by the galvanometer coil 62.

Referring back to Fig. 1, after the operation of motor 10 is initiated, the disc 11 and arm 12 begin to rotate in synchronism with disc 66 and arm 67 of Fig. 2. When the disc 11 starts to rotate, the insulating notch 15 passes out of engagement with the brush 19 whereby an energizing circuit to motor 10 is completed through brush 19, ring 12b, and brush 17 from the source 42. Such a circuit maintains energization of the motor 19 irrespective of the subsequent de-energization of electromagnet 45 when brush 21 leaves contact 22. This principal energizing circuit to motor 10, due to the brush 19 being in engagement with ring 12b, is then only interrupted when the insulating notch 16 comes into engagement with the brush 19 or, after 180° of revolution of the motor 10. When the notch 16 does come into engagement with the brush 19, it is then necessary that the electromagnet 45 be again energized to initiate the operation of motor 10.

A similar arrangement prevails in the operation of motor 65 in Fig. 2. After the initial energization of motor 65, due to actuation of armature 64 by electromagnet 62, the disc 66 is rotated so that the insulating notch 98 is moved out of engagement with brush 101. The current supply to motor 65 from the feeder lines 53 is then maintained independently of the circuit through armature 64, due to engagement of brush 101 with ring 97. The brush 100, continuously in engagement with ring 97, maintains an energizing circuit thereto from feeder lines 53. The energization circuit to motor 65 will now be interrupted only when the insulating notch 99 comes into engagement with the brush 101 after 180° of revolution of disc 66.

As the arm 12 is rotated by motor 10 in the direction indicated by the arrow, the brush 21 will leave contact 22, thereby interrupting the energizing circuit to electromagnets 45 and 46, whereupon the starting circuit to motor 10 through armature 45b is interrupted and the supply of carrier energy to the power network is interrupted due to release of armatures 46a and 46b. As the arm 12 rotates, the brush 21 will pass over contact 23. The circuit to contact 23 is controlled by switch 1 and, in the present instance, is dormant inasmuch as armature 30b is in a released condition. The brush 21 next arrives at the contact 24. As soon as the brush 21 comes into engagement with contact 24, a circuit is established from the energy source 42 through brush 17, ring 12b, brush 18, armature 31a, to sector 29. From sector 29 the energizing circuit is completed to electromagnets 45 and 46. Energization of electromagnet 46 again closes armatures 46a and 46b whereupon carrier energy is again impressed upon the power network.

Referring to Fig. 2, the arm 67 has been rotated, by motor 65, in synchronism with arm 12. When the brush 68 passed engagement with contact 71 no switching operation resulted, due to the fact that the circuit through armature 93 was open as electromagnet 63 was short-circuited by armature 64. Now when the brush 68 comes into engagement with contacts 72—80, the coil 62 will be energized due to the carrier energy impressed on the power network by closing of armatures 46a and 46b when brush 21 comes into engagement with contact 24. Energization of coil 62 actuates armature 64 whereby energy is applied to the electromagnet 63 through resistance 77 and condenser 78. Energization of electromagnet 63 actuates armatures 92—95. The brush 68 now being in engagement with contact 72—80 completes an energizing circuit between contacts 72 and 80 so that a voltage is applied to the electromagnet 87. When the electromagnet 87 is thus energized the armatures 87a and 87b are actuated. Actuation of armature 87a completes a holding circuit to electromagnet 87 which can only be interrupted by short-circuiting of the electromagnet 87 as will be hereinafter explained. Actuation of armature 87b completes the power circuit to load "Y" which is maintained until the electromagnet 87 is short-circuited in an "off" switching operation. After thus accomplishing the energization of electromagnet 87 so that power is applied to load "Y", the arms 12 and 67 continue to rotate in synchronism. When the brush 21 leaves contact 24 the circuit to electromagnet 46 is interrupted whereby armatures 46a and 46b are released and the carrier energy supply to the power network is interrupted. As brush 22 passes the subsequent contacts 25—28 there is no resulting switching operation since none of these contacts are now in completed energizing circuits in the present described step. Likewise, the continued rotation of arm 67 produces no further switching operations for a similar reason.

When the disc 11 approaches 180° of rotation and after brush 21 has passed contact 28, the insulating notch 14 comes into engagement with the brush 18 thereby interrupting the holding circuit through armature 31b to electromagnet 31. The electromagnet 31 is thereupon de-energized and the armature 31a and 31b released. The insulating notch 16 then comes into engagement with brush 19 whereupon the energizing circuit to motor 10 is interrupted and the disc 11 is brought to rest in a position such that the brush 18 has just come into engagement with the ring 12b after the insulating notch 14 has passed thereunder. The arm 12 will also be brought to rest at a position such that the brush 21a will have just come into engagement with contact 22 and sector 29. At the same time, the motor 65 will have rotated the disc 66 into a position such that insulating notch 99 comes into engagement with brush 101, thereby interrupting the energizing circuit to motor 65. The disc 66 is then brought to rest in a position such that the insulating notch 99 is in engagement with brush 101. The arm 67 will also be brought to rest in a position such that brush 68b has just come into engagement with contacts 70 and 78.

In this condition, the disc 11 and arm 12 of the controlling apparatus and the disc 66 and arm 67 of the controlled apparatus will be in a starting position suitable for further controlling operation, while the load "Y" will be connected to the power network due to the continued energization of electromagnet 87. Under such conditions the operator may depress other of the "on" switches, such as switches 1 and 3 in Fig. 1, in order to obtain the connection of load "X" or load "Z" with the power network. The operations for such connections would be similar to those just previously described with the exception that the circuits associated with load "X" or load "Z" would be energized instead of the circuits associated with load "Y". Let it be assumed that the operator desires to disconnect the load "Y" from the feeder lines 53 of the power network. The operator will then depress switch 5 which is the "Y-off" switch. Momentary depression of switch 5 completes an energizing circuit from brush 18 through contacts 5a and 5b to the electromagnet 34, whereupon the armatures 34a and 34b are actuated. At the same time, an energizing circuit is completed from brush 18 through contacts 5a and 5c to contact 22. The brush 21a, now in engagement with contact 22 will complete a circuit through sector 29 to electromagnets 45 and 46. Energization of electromagnets 45 and 46 causes the actuation of armatures 45a and 45b whereupon the operation of motor 10 is initiated as before described. At the same time energization of electromagnet 46 causes the actuation of armatures 46a and 46b, thereby impressing the initial carrier current impulse on the power network, also as before described. The supply of carrier current to the power network will only be interrupted when brush 21a leaves contact 22. The initial carrier impulse will then cause initiation of operation of motor 65 in a manner similar to that previously set forth. The brush 21a will now pass by contacts 23, 24, 25, and 26, without causing any switching operations as circuits to these contacts are open at other points. However, when brush 21a comes into engagement with contact 27, a circuit will be established to sector 29 since armature 34b is now closed. The electromagnet 46 will then again be energized and cause carrier energy to be impressed upon the power network. This carrier energy on the power network will act through filter 60 to cause the energization of coil 62 whereby the armatures 92—95 are closed by electromagnet 63 at the time that the brush 68b has arrived in contacting engagement with contacts 75 and 83. As soon as the brush 68b has engaged with contacts 75 and 83 a circuit is completed through armature 94 which short-circuits electromagnet 87, thereby releasing armatures 87a and 87b. The connection between the load "Y" and the feeder lines 53 of the power network is then interrupted.

The rotated mechanism in both the controlling apparatus and the controlled apparatus will continue to rotate. When the notch 13 of disc 11 comes into engagement with brush 18 the energizing circuit to electromagnet 34 will be interrupted and the armatures 34a and 34b released. When the insulating notch 15 comes into engagement with brush 19 the energizing circuit to motor 10 will be interrupted and the disc 11 and arm 12 will be brought to rest at the initial or starting position of Fig. 1. Likewise, when insulating notch 98 now comes into engagement with brush 101, the energizing circuit to motor 65 will be interrupted and the disc 66 and arm 67 will be brought to rest in an initial or starting position such as shown in Fig. 2.

It will be evident, in the operation of my remote control system, that the operator may depress any of the "on" keys or "off" keys in any sequence he may desire. Thus the operator may, in sequence, connect or disconnect a plurality of loads. Similarly the operator might connect certain loads and disconnect others in a sequence of switching operations. At any event, the only manual requirement for the operator is to momentarily depress the switch controlling the given operation, which is automatically accomplished. As before pointed out, various numbers and arrangements of loads as well as various types of loads may be employed in accordance with my system.

It will be apparent that I have provided a novel remote switching control system which, in its use, offers many advantages over such systems now known in the art. Although I have shown a preferred embodiment of my system it will of course be obvious that many changes may be made therein without departing from the intended scope of my invention.

I do not, therefore, desire to limit myself to the foregoing except insofar as may be pointed out in the appended claims.

What I claim as new and desire to secure by Letters Patent of the United States is:

1. A control system comprising, controlling apparatus and controlled apparatus, said controlling apparatus comprising, a plurality of selection circuits respectively under control of a plurality of switches, means for producing alternating current control signal energy of one predetermined frequency only, means for causing said signal energy producing means so effectively transmit alternating current control signal energy of said one frequency to said controlled apparatus, and movable means for connecting any one of said selection circuits to said last mentioned means to cause the operation thereof; and said controlled apparatus comprising, a control signal energy responsive circuit controller, a plurality of control circuits, and movable means for connecting said responsive device with any one of said control circuits, said movable means being moved in synchronism with the movable means of said controlling apparatus, whereby the actuation of a selected one of said switches in said controlling apparatus effects the transmission of control signal energy to effect the operation of a desired one of said control circuits in said controlled apparatus.

2. A control system in accordance with claim 1 in which said switches in said controlling apparatus are manually operated.

3. A control system in accordance with claim 1 in which said movable means in said controlling apparatus and in said controlled apparatus comprises synchronous motors.

4. A control system in accordance with claim 1 in which said movable means in said controlling apparatus and said controlled apparatus include synchronous motors; a source of regulated alternating current for energizing said motors, wire lines for commonly conveying said alternating current and said control signal energy from said controlling apparatus to said controlled apparatus.

5. A control system in accordance with claim 1 in which said movable means in said controlling apparatus and said controlled apparatus comprise synchronous motors, and including a source of alternating current for said motors, common wire lines for transmitting said alternating current and said control signal energy from said controlling apparatus to said controlled apparatus, and connections in said controlled apparatus whereby an energizing circuit to the synchronous motor therein is controlled by the movable means of said controlled apparatus.

6. A control system comprising, controlling apparatus, controlled apparatus, and wire lines interconnecting said controlling apparatus and said controlled apparatus: said controlling apparatus comprising, a source of alternating current, a plurality of switches, electromagnets respectively controlled by said switches, armatures controlled by said electromagnets, a motor, a contacting disc having brushes engaging therewith, a contacting arm adapted to be moved by said motor, a plurality of contacts positioned for sequential engagement by said contacting arm, a signal energy generator, an electromagnetic switch for conecting said generator with said wire lines, connections from said source of energy through said contacting disc and brushes and said armatures, whereby the actuation of one of certain of said switches completes an energizing circuit to said motor, said circuit being subsequently controlled by the movement of said contacting disc with respect of the brushes thereof, circuits for maintaining the energization of any one of said electromagnets for periods of time determined by the movement of said contacting disc with respect to the brushes thereof, circuits connected through said armatures respectively with the contacts associated with said arm whereby the actuation of one of said switches energizes an associated electromagnet for moving the armatures thereof so that circuits are established for causing the energization of said motor and for establishing a circuit to one of said contacts to be engaged by said arm to actuate said electromagnetic control switch to impress control energy upon said wire lines when said arm comes into engagement with said selected contact; said controlled apparatus comprising, a signal energy responsive switch, a motor, a contact disc and brushes for engagement therewith, a contacting arm, a plurality of contacts adapted to be engaged by said contacting arm, said arm and said disc being moved by said motor, an energizing circuit to said motor initially controlled by said signal responsive switch but subsequently controlled by the movement of said contacting disc with respect to the brushes thereof, a plurality of power loads, switches for completing circuits to said power loads, electromagnets for controlling said switches, and circuits whereby the initial actuation of said signal responsive switch causes the energization of said motor for moving said disc and arm so that when said arm engages with certain of said contacts, signal energy transmitted over said wire lines will cause an energizing circuit to be established through that contact to a selected one of said electromagnets for actuating the switch associated therewith for completing a circuit to a particular power load, and other circuits operative when said arm is in engagement with one of certain other of said contacts, so that signal energy received by said signal responsive switch, will cause a short circuit of said previously energized electromagnet for opening the circuit to said selected power load.

ARTHUR M. TROGNER.